United States Patent
Lux, Jr. et al.

(10) Patent No.: US 6,446,417 B1
(45) Date of Patent: Sep. 10, 2002

(54) ARTICLE-EMBEDDED FOLDING SLEEVE AND METHOD FOR PRODUCING SAME

(75) Inventors: Gerard Paul Lux, Jr.; Melanie A. Moore; Thompson G. McRae, all of Charlotte, NC (US)

(73) Assignee: Cadmus, Charlotte, NC (US)

( * ) Notice: Subject to any disclaimer, the term of this patent is extended or adjusted under 35 U.S.C. 154(b) by 0 days.

(21) Appl. No.: 09/777,992

(22) Filed: Feb. 6, 2001

(51) Int. Cl.[7] .............................................. B65D 85/57
(52) U.S. Cl. ...................... 53/462; 206/308.1; 206/312
(58) Field of Search ................................ 206/308.1, 15, 206/309, 311–313; 53/467, 462, 473, 206, 209, 476; 281/38.29, 45; 402/4, 79, 80 R

(56) References Cited

U.S. PATENT DOCUMENTS

| | | | |
|---|---|---|---|
| 4,640,413 A | * 2/1987 | Kaplan et al. | 206/312 |
| 5,085,318 A | * 2/1992 | Leverick | 206/312 |
| 5,460,265 A | * 10/1995 | Kiolbasa | 206/312 |
| 5,690,220 A | * 11/1997 | Swan | 206/312 |
| 5,713,605 A | 2/1998 | Pace et al. | |
| 5,772,019 A | * 6/1998 | Reed | 206/308.1 |
| 5,775,490 A | * 7/1998 | Baker et al. | 206/308.1 |
| 5,881,538 A | 3/1999 | Blohm | |
| 5,950,401 A | 9/1999 | Blohm et al. | |
| 6,016,907 A | * 1/2000 | Dreier | 206/308.1 |
| 6,068,117 A | * 5/2000 | Koehn | 206/312 |
| 6,126,201 A | 10/2000 | Pace et al. | |
| 6,250,462 B1 | * 6/2001 | Kato | 206/312 |

* cited by examiner

*Primary Examiner*—Luan K. Bui
(74) *Attorney, Agent, or Firm*—Summa & Allan, P.A.

(57) ABSTRACT

A packaging blank capable of forming a sleeve having at least one internal cavity comprises in one embodiment a substantially rectangular bottom panel, a substantially rectangular top panel connected to the bottom panel along a fold line, and a perforated retaining wall formed in the top panel, wherein the top panel includes at least one display window. Upon construction the packaging blank provides a sleeve having at least one internal cavity that is viewable through at least one display window. A method of packaging an article comprises in one embodiment the steps of providing a blank, placing an article to be packaged on the blank, folding the top panel over the bottom panel, and binding the sleeve formed by the blank into a publication.

11 Claims, 3 Drawing Sheets

ARTICLE-EMBEDDED FOLDING SLEEVE AND METHOD FOR PRODUCING SAME

FIELD OF THE INVENTION

The invention relates to a packaging sleeve. In particular, the invention relates to a packaging blank capable of forming a sleeve having at least one internal cavity. The invention further relates to a sleeve formed from the blank that includes at least one internal cavity and at least one retaining panel. Still further, the invention relates to a method of packaging an article in the sleeve wherein the sleeve is formed around the article to be packaged.

BACKGROUND OF THE INVENTION

Publications such as magazines have become a popular vehicle for promoting the goods and services of a variety of consumer-oriented providers. For example, the advances in media technology coupled with the popularity of sound and video recording have resulted in the packaging and binding of large numbers of stored media items, such as compact discs (CD) and digital video discs (DVD), into magazines. As applied to the media industry, packaging is often used to ship complimentary CDs and DVDs containing software for on-line service providers. Alternatively, packaging is used to ship CDs or DVDs containing promotional presentations of a merchant's goods or services to potential or existing customers. Moreover, providers often distribute substantially flat or near planar articles via magazines. Consequently, the packaging industry is attempting to meet increased demand by providing improved packaging tailored to CDs, DVDS, and substantially flat articles, and developing more efficient methods of packaging the same.

For ease of reference, the term "article" will refer to a CD or DVD. Nevertheless it will be understood that the article may include any number of substantially flat or near planar articles. It will be further understood by those skilled in the art that as used herein, the term CD refers to a stored media item made of single-piece construction. Further, the term DVD refers to a stored media item made of multi-piece construction, thereby allowing increased storage capacity.

Conventional packaging includes a top wall, bottom wall, and closure panels for containing various articles, such as stored media items, or substantially flat articles. As known to those skilled in the art, packaging is typically formed from packaging blanks, or blanks for short. It will be understood that as used herein the term "blank" may include paperboard, rigid paper, flexible polyester film, or similar products made of paperboard or polyester film. These blanks are capable of being formed into sleeves for incorporation into printed publications (e.g., magazines, periodicals, etc.). Typical sleeves are formed from flexible polyester film. Another form of sleeve for shipping CDs and DVDs is comprised of a flat blank of paperboard divided into equal first and second sections by a fold line. A scored line typically defines the fold line.

The publishing industry favors substantially rectangular one-piece flexible blanks because the blanks are readily incorporated into automated processes for binding sleeves into publications, such as magazines and books. Actual insertion of the article into the sleeve is accomplished by either manual or automated processes. Manual insertion of articles is slow and labor intensive. Although typically more efficient than manual insertion, current automated insertion systems may result in increased waste, slower production speeds, and may also require additional labor on the production line. By supplying an article-embedded sleeve, the need for manual or in-line insertion of articles is eliminated, thus creating significant efficiencies in the production process.

Most current processes employed create packaging on one apparatus and then insert articles on a separate apparatus after the container is formed. The method of packaging articles described above typically uses a belt-driven conveyor for advancing a blank along a production line. In production, the blank is folded along fold lines and portions of the blank are secured to one another (e.g., by adhesive) to form a sleeve. Subsequently, the primary article (e.g., CD) is either mechanically or manually inserted into the sleeve.

The more efficient methods for packaging CDs or DVDs into sleeves are automated. One method for packaging includes the following steps: advancing blanks along a conveyor to a scoring position, scoring the blank along a center line dividing the blank into two equal portions, advancing the scored blank to an adhering position, applying adhesive to edges of the sleeve positioned perpendicular to the fold line, advancing the blank to a folding position, folding the blank along its score line such that the equal portions are folded against and adhered to one another to thereby form a sleeve, advancing the sleeve to an article inserting position, laterally inserting the CD or DVD into the sleeve, and subsequently sealing the remaining open end. Unfortunately, the lateral insertion of CDs or DVDs (i.e., coplanar movement) into the open end or slit in the sleeve is inherently slow. Stated differently, the automated process of laterally inserting CDs and DVDs leads to misalignment and misplacement, thus resulting in breakage of the article or complete failure to place the article into the sleeve. In the event that the article is broken or misplaced, the production line must be halted. Furthermore, the likely occurrence of misplaced articles, thus resulting in empty sleeves, requires increased vigilance on the part of quality control managers.

Several types of sleeves lack windows that permit a view of the packaged article and any information (e.g., CD title) printed on the media item. Without such a window, it is not obvious that the package contains the media item it carries. This often results in the recipient discarding a package without the knowledge that it contains a valuable media item. Therefore, it is desirable to provide a packaging blank capable of forming a sleeve that includes at least one display window that permits viewing of an article contained therein.

Moreover, most sleeves lack a retaining flap that facilitates frontal access to an article positioned in the sleeve. For example, most sleeves include a closure panel attached to an open end of the sleeve and adhered to an exterior portion of the sleeve. In order to access the article, a consumer must detach a corner of the closure panel that is adhered to the sleeve and then tear the closure panel from the sleeve. Typically, the consumer tears the sleeve during the removal of the article. Accordingly, there is a need for a packaging sleeve suitable for use with conventional binding machinery that permits frontal access to an article positioned therein.

The packaging industry has attempted to meet the demand for providing, for example, promotional CDs through joint efforts with the publishing industry. One method is to stack the sleeve on top of a magazine and then wrap the sleeve-magazine combination in an oftentimes transparent film to form a bag. This method is commonly referred to as "polybagging." As known to those of ordinary skill in the art, polybagging includes loosely wrapping polyester or polyethylene based film around the magazine-sleeve combination and thereafter heat sealing the ends of the bag.

Alternatively, a CD may be placed in a packaging sleeve and then bound to a magazine with an adhesive. One method of adhering a sleeve to a publication in this manner involves binding the sleeve into the spine and is commonly referred to as the "perfect bound" method. Another method utilizing adhesive requires the sleeve to be attached to the face of one of the pages in the publication and is commonly referred to as "tipping." Yet another method for binding a sleeve and a magazine includes fastening a portion of the sleeve to the pages of the magazine by stitching during the binding process.

The method of stitching is commonly refereed to as "saddle stitching." In order to perform the stitching, however, the sleeve must provide a binding flap for receiving the stitching that binds the sleeve to the pages of the publication.

The prior art reveals sleeves that are approximately the same size as a CD. In other words, prior art sleeves fail to provide excess surface area extending beyond the perimeter of the CD. As a result, the prior art sleeves containing a rigid CD lack the flexibility for inclusion into conventional binding machinery. Moreover, the relatively smaller size of the sleeves, as compared to the pages of the publication to which they are bound, minimizes the print space available for advertising or related information. Current sleeves capable of being fed using standard feeders require that those feeders operate at significantly slower speeds as compared to their maximum rate of speed.

Typical conventional automated binding processes require prior art sleeves to be fed into the pages of a publication with specialty feeders. Unfortunately, the specialty feeders tend to slow the binding process along the automated production line. Consequently, the entire automated process is slowed. Stated differently, the maximum production speed for providing sleeves bound in publications is limited by the rate at which the feeders are able to feed the sleeves into the production line. Thus, there is a need for an articleembedded sleeve that does not require the use of a specialty feeder during binding and does not slow the rate of production for a standard feeder.

For example, U.S. Pat. No. 5,694,743 to Beighle describes a sleeve containing a computer disc product that is incorporated into a book and a method of providing the combined product. The sleeve of Beighle is a five-section blank that includes a base ply, cover ply, gluing flap, trim flap, and a closure and access flap. The method of the '743 patent includes directing pressurized air into an opening in the sleeve, laterally inserting the disc into the enlarged opening in the sleeve, and then sealing the sleeve. Stated differently, the disc is laterally inserted into a completed sleeve. As disclosed, the '743 patent fails to disclose a sleeve having a display window and frontal access that is capable of incorporation into conventional binding processes without the need for specialty feeders. Moreover, Beighle fails to disclose a method of forming a sleeve around the article to be packaged. As described, Beighle's method of laterally inserting, for example, a CD slows the binding process for the reasons stated above (i.e., misplacement).

Thus, there is a need for a sleeve that can be bound into a publication utilizing current common feeders that minimizes or eliminates the hindrances associated with current sleeves. Additionally, these sleeves should allow the advertiser to take advantage of the full-page size of the publication to communicate their advertising messages. Furthermore, the sleeve needs to be flexible enough to allow it to bend sufficiently to wrap around the wheels and drums associated with publication bindery equipment.

OBJECT AND SUMMARY OF THE INVENTION

It is therefore an object of the present invention to provide for the packaging of a substantially planar article (e.g., CD or DVD) suitable for use in automated binding.

Another object of the invention is the provision of a sleeve formed from a blank that increases the efficiency of automated binding processes.

Yet another object of the invention is the provision of a sleeve that promotes frontal access to an article without destroying the sleeve.

A further object of the invention is to increase the manufacturing efficiencies associated with placing articles in sleeves.

Another object of the invention is to maximize the advertising space on a sleeve.

Yet a further object of the invention is the provision of an article-embedded sleeve that can be readily incorporated into existing binding processes without the need for specialty feeders in order to increase the rate of production for bound publications including sleeve inserts.

The invention meets these objectives with a packaging blank capable of forming a sleeve having at least one internal cavity. In particular, the invention is a packaging sleeve having at least one display window that provides a view of the internal cavity of the container upon construction. In another aspect, the invention is a method for packaging an article that incorporates the blank wherein the sleeve is formed around the article.

The foregoing and other objects and advantages of the invention and the manner in which the same are accomplished will become clearer based on the following detailed description taken in conjunction with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
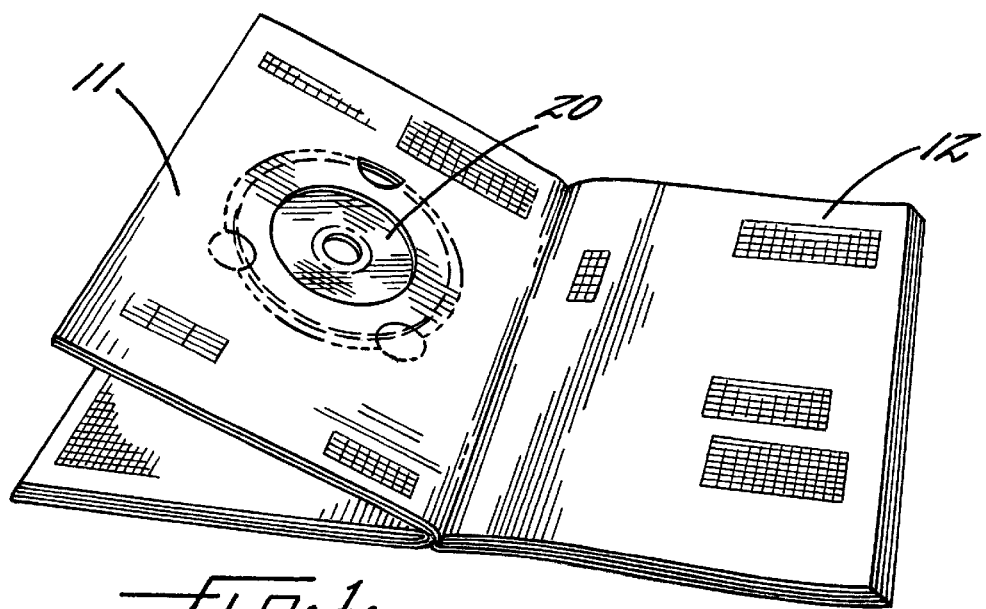
FIG. 1 is a perspective view of the invention as used in connection with a bound publication.

An overall view of the packaging blank 10 formed into a sleeve 11 containing a CD 20 used in conjunction with a printed publication 12 that incorporates features of the present invention is set forth in FIG. 1. As used herein, the term "panel" is used in conjunction with the packaging blank 10 of the present invention and refers to sections of the blank. See FIGS. 7 and 8. Further, the term "wall" is used in conjunction with the sleeve 11 of the present invention and refers to structures forming the sleeve.

Figure 7:
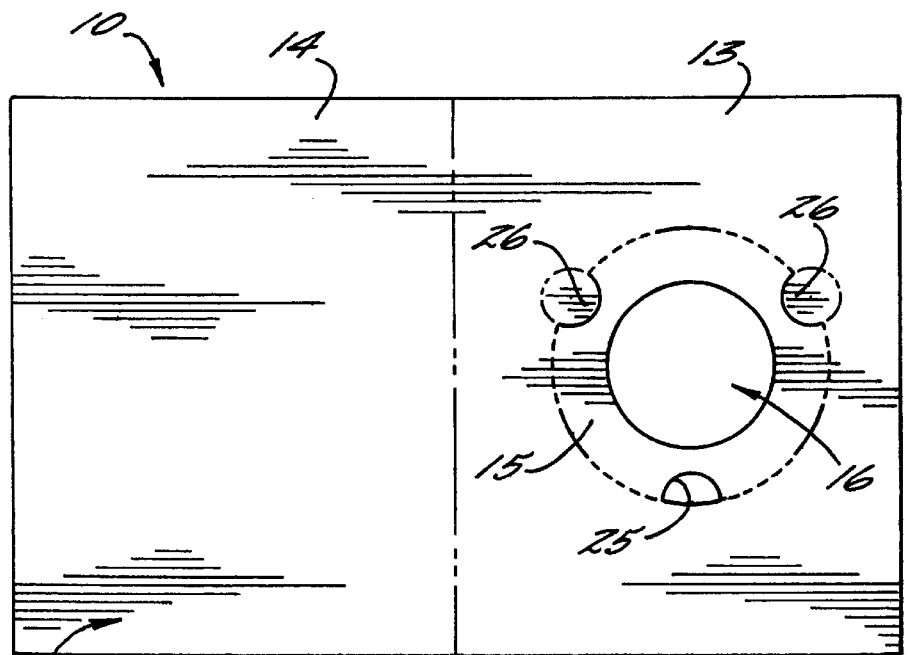
FIG. 7 is a top plan view of the packaging blank depicting the top panel, bottom panel, access slots, display window, and perforated retaining flap of the preferred embodiment.

As depicted in FIG. 7, a preferred embodiment of the packaging blank 10 includes a top panel 13, a bottom panel 14, and a retaining flap 15. It will be understood by those of skill in the art that the terms top panel and bottom panel, and top wall and bottom wall, are also referred to as front panel and rear panel in the packaging industry.

With reference to the orientation of the invention in FIG. 7, it will be understood that the term "width" refers to a distance measured from the left edge of a panel or binding flap to the right edge of a panel or binding flap. It will be further understood that the term "height" refers to a distance measured from the lowermost edge of a panel, binding flap, or sleeve to the uppermost edge of the panel, binding flap, or sleeve.

It will be further appreciated by those of ordinary skill in the art that, as used herein, the concept of a panel or wall being "between" two other panels or walls does not necessarily imply that the three panels or walls are contiguous (i.e., in intimate contact). Rather, as used herein, the concept of one panel or wall being between two other panels or walls is meant to describe the relative positions of the panels or walls within the blank or container structure, respectively. Similarly, as used herein, the concept of a first panel being connected to a second panel by a third panel, "opposite" the second panel, merely describes the relative positions of the first and second panels within the blank structure.

The top panel 13 of the preferred blank 10 as shown in FIG. 7 includes at least one display window 16. An alternative embodiment of the preferred blank 10 may include a plurality of windows (not shown). The bottom panel 14 is connected to the top panel 13 along a fold line. Upon constructing the blank 10 into a sleeve 11, the window facilitates viewing of a substantially flat or near planar article 20 contained within the sleeve 11 as discussed herein.

Figure 8:
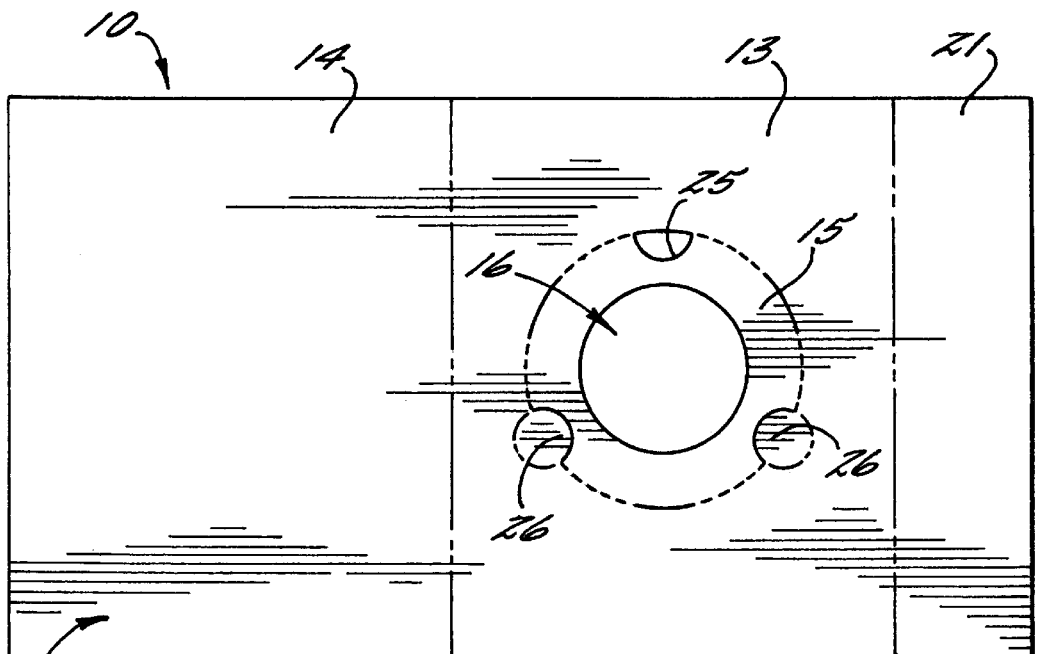
FIG. 8 is a top plan view of an alternative embodiment of the packaging blank displaying the top panel, bottom panel, access slots, display window, perforated retaining flap, and a binding flap.

In an alternative embodiment as illustrated in FIG. 8, the top panel 13 includes a substantially rectangular binding flap 21 positioned opposite the bottom panel 14. Thus, the top panel 13 is positioned between the bottom panel 14 and binding flap 21 in the alternative embodiment. The width and height of the binding flap 21 is preferably less than or about equal to the width of the top and bottom panels 13, 14. It will be understood, however, that the width and height of the binding flap 21 may be greater than the width and height of the top and bottom panels 13, 14 for use on, for example, modified binding machinery. The binding flap 21 of the alternative embodiment facilitates the binding of the sleeve 11 formed from the blank 10 into a publication 12. Specifically, the binding flap 21 provides a generally flat planar surface for receiving conventional saddle stitching used to bind publications. In other words, the binding flap 21 provides an ample stitching surface into which stitches are placed in order to bind the sleeve 11 into a publication along with the primary pages of the publication.

In the preferred embodiment, the top and bottom panel 13, 14 are substantially rectangular. Likewise, in the alternative embodiment, the binding flap 21 is substantially rectangular, but is not limited to a rectangular shape. Nevertheless, it will be understood that the top and bottom panels 13, 14 are not limited to a rectangular shape and may, for example, may be oval, polygonal, or elliptical.

As illustrated in the preferred embodiment of FIG. 7, the packaging blank 10 may be a one-piece flexible blank formed from a flexible material capable of incorporation into conventional binding machinery (e.g., flexible polyester film or paperboard) without assistance from a specialty feeder. The flexible blank 10 includes an external planar side 22 and an internal planar side 23. The external planar side 22 is preferably finished. As used herein, it will be understood that the term "finished" means coated with a material to produce an attractive glossy finish. The term "finished" will also be understood to mean the inclusion of printed material or other identifying indicia (e.g., a company's logo).

In order to facilitate the formation of a substantially rectangular sleeve 11, the width and height of the top and bottom panels 13, 14 of the preferred embodiment are about equal to one another.

As shown in FIG. 7, the preferred embodiment of the present invention provides a retaining flap 15 that is formed by perforations in the top panel 13. An alternative embodiment may include a plurality of retaining flaps 15. Further, the top panel 13 of the preferred embodiment includes at least one display window 16. Alternatively, the top panel 13 may include a plurality of display windows 16, such that each retaining flap 15 includes a corresponding display window 16. It will be appreciated that, as used herein, the concept of a retaining flap corresponding to a display window refers to an ordered relationship (e.g., wherein the retaining flap is substantially surrounding the display window).

The retaining flap 15 is positioned on the bottom panel 14 such that the flap substantially surrounds the display window 16. Stated differently, the display window 16 is bordered by the retaining flap 15. As configured, the retaining flap 15 of the preferred embodiment defines the entire perimeter of the display window 16.

In the preferred embodiment, the retaining flap 15 and display window 16 are substantially circular. Nevertheless, it will be understood that the retaining flap 15 and display window 16 are not limited to a circular shape and may be, for example, rectangular, oval, polygonal, semi-circular, or elliptical. Further, the radius of the display window 16 is preferably less than the radius of the perforated retaining flap 15. To accommodate the packaging of a CD or DVD, the diameter of the perforated retaining flap 15 is preferably greater than 120 millimeters. In one embodiment, the retaining flap 15 and the display window 16 may be substantially concentric.

In this configuration, the retaining flap 15 formed in the top panel 13 provides a consumer with frontal access to a substantially flat or near planar article, for example, a CD that may be placed in an internal cavity 24 formed when the blank 10 is constructed into a sleeve 11. In a preferred embodiment of the blank 10, the top panel 13 includes at least one access slot 25 formed adjacent the perforated retaining flap 15. Further, the top panel 13 of an alternative embodiment may include at least one access tab 26 formed adjacent the perforated retaining flap 15. In this configuration, the access slot 25 and access tab 26 facilitate the removal of the retaining flap 15. It will be understood that the access slot 25 and the access tab 26 may be formed on either side of the perforations defining the retaining flap 15. In one embodiment, the access slot 25 and the access tab 26 are aligned with respect to one another such that the access tab 26 engages the access slot 25 in a corresponding fashion. For ease of use in conventional binding machinery, however, it will be understood that a preferred embodiment will include at least one access slot 25 and no access tab 26, as the tabs may catch adjacent printed matter during binding procedures.

Figure 4:
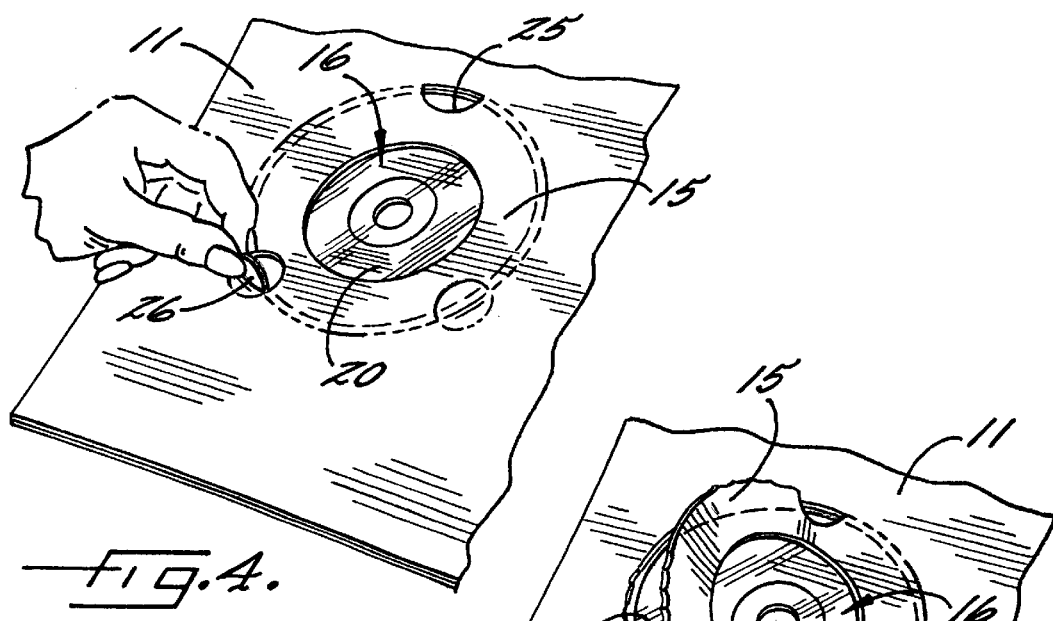
FIG. 4 is a perspective view of the invention depicting a consumer inserting a finger into an access slot formed in the top wall and raising an edge of an access tab adjacent the slot to gain access to the article contained within the internal cavity.
Figure 5:
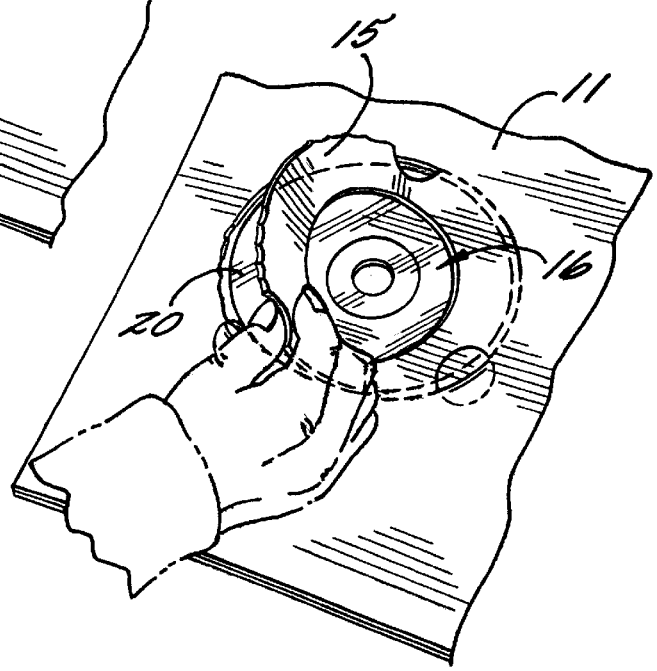
FIG. 5 is a perspective view of the invention depicting the user detaching a selective portion of retaining flap.
Figure 6:
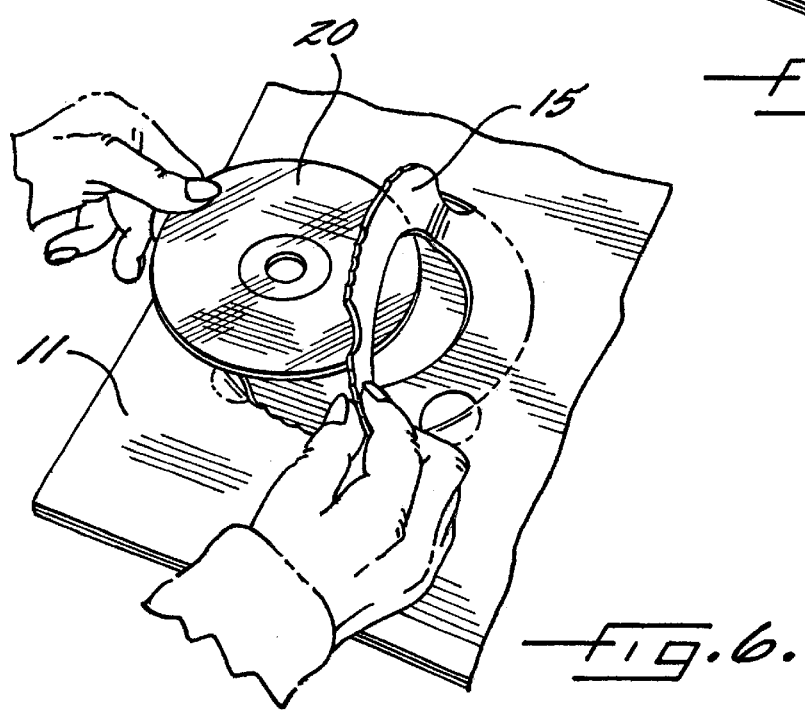
FIG. 6 is a perspective view of the invention illustrating the user removing the article from the internal cavity.

In use, the sleeve 11 formed from the blank 10 permits the consumer to grasp the edge of the retaining flap 15 adjacent an access slot 25, lift the retaining flap upwardly and away from the sleeve 11 to tear the perforations in the top panel 13, thereby separating at least a portion of the retaining flap from the bottom panel 14 and providing access to the article 20 contained within the internal cavity 24. See FIGS. 4, 5, and 6.

As configured, the display window 16 is positioned on the top panel 13 such that the internal planar side 23 of the bottom panel 14 is viewable through the display window 16 bottom upon construction of the sleeve 11. Multiple display windows 16 thereby provide a view of at least two different positions on the internal planar side 23 of the bottom wall 31. Accordingly, two windows would provide a view of two separate articles and any indicia (e.g., tile or bar code) printed thereon.

Figure 2:
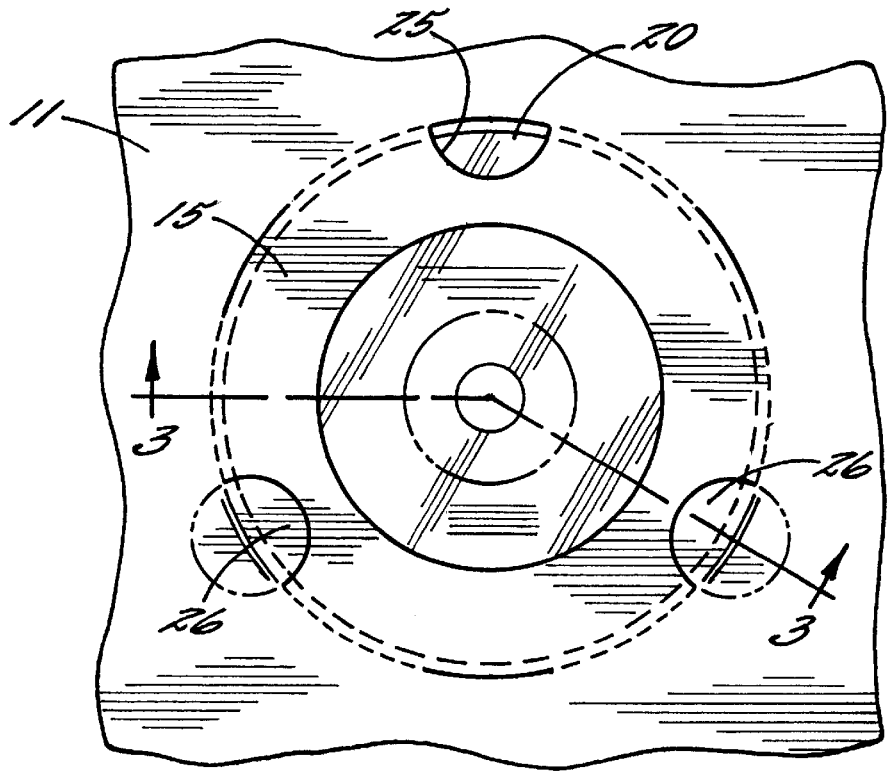
FIG. 2 is a top plan view of the sleeve displaying a CD placed on the bottom panel, the top panel including a perforated retaining flap, a display window, and access slots.
Figure 3:
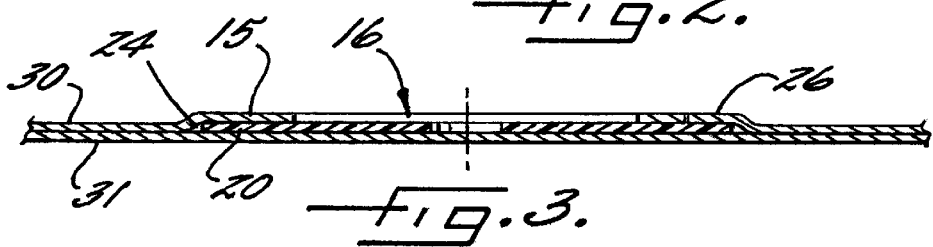
FIG. 3 is a cross-sectional view of the sleeve taken generally along lines 3-3 of FIG. 2 illustrating the CD positioned in the internal cavity between the top and bottom walls.

Another aspect of the present invention, as illustrated in FIGS. 1–3, includes a sleeve 11 formed from the packaging blank 10 that has at least one internal cavity 24. As described above, the term "wall" is used in conjunction with the container of the present invention—as opposed to the previously described blank. Further, the term wall refers to structures forming the container—opposed to the sections of the blank 10.

With reference to FIGS. 2 and 3, a preferred embodiment of the sleeve 11 includes a top wall 30, a bottom wall 31, and a retaining flap 15. In the preferred embodiment the top wall and bottom wall 31 are substantially rectangular in shape, but may be oval, polygonal, or any similar shape supporting the construction of a sleeve 11. The bottom wall 31 is connected to the top wall 30 along a fold line. A display window 16 is provided in the bottom wall 31 for viewing an interior portion of the bottom wall. See FIG. 3. It will be understood that an alternative embodiment of the sleeve 11 may include multiple retaining flaps 15 and multiple display windows 16 corresponding to each retaining flap.

The top wall 30 of an alternative embodiment of the sleeve 11 (not shown) includes a substantially rectangular binding flap 21 positioned opposite the bottom wall 31. In the alternative embodiment, the binding flap 21 is substantially rectangular, but is not limited to a rectangular shape. The width and height of the binding flap 21 is preferably less than or about equal to the width and height of the top and bottom walls 30, 31. The binding flap 21 facilitates the binding of the sleeve 11 into a publication. Specifically, the binding flap 21 provides a flat surface for receiving conventional saddle stitching used to bind publications.

The top and bottom walls 30, 31 of the preferred embodiment are substantially rectangular, however, it will be understood that the top and bottom wall are not limited to a rectangular shape and may be, for example, oval, polygonal, or elliptical. In order to facilitate the formation of a substantially rectangular sleeve 11, the height and width of the top and bottom walls 30, 31 of the preferred embodiment are about equal to one another.

As shown in FIGS. 2 and 3, the preferred embodiment of the present invention provides a retaining flap 15 that is formed by perforations in the top wall 30. The top wall 30 of an alternative embodiment may include a plurality of retaining laps 15. The top wall 30 includes a display window 16, but t will be understood that the top wall may include a plurality of display windows corresponding to a plurality of retaining flaps 15. The retaining flap 15 is positioned on the top wall 31 such that the flap substantially surrounds the display window 16.

In the preferred embodiment, the retaining flap 15 and display window 16 are substantially circular. It will be understood, however, that the retaining flap 15 and display window 16 are not limited to a circular shape and may be, for example rectangular, oval, polygonal, semi-circular, or elliptical. The radius of the display window 16, likewise, is preferably less than the radius of the perforated retaining flap 15. The diameter of the perforated retaining flap 15 is preferably greater than 120 millimeters to accommodate the packaging of a CD. The retaining flap 15 and the display window 16 may also be concentric.

In this configuration, the retaining flap 15 formed in the top wall 30 provides a consumer with easy access to a substantially flat or near planar article 20 positioned in the internal cavity 24 of the sleeve 11 formed from the blank 10. See FIGS. 4, 5 and 6. In a preferred embodiment of the blank 10, the top wall 30 includes at least one access slot 25 formed adjacent the perforated retaining flap 15. See FIG. 2. Further, the top wall 30 of an alternative embodiment may include at least one access tab 26 formed adjacent the perforated retaining flap 15. In this configuration, the access slot 25 and access tab 26 facilitate the removal of the retaining flap 15. It will be understood that the access slot 25 and the access tab 26 may be formed on either side of the perforations defining the retaining flap 15. In one embodiment, the access slot 25 and the access tab 26 are aligned with respect to one another such that the access tab engages the access slot in a corresponding fashion.

The sleeve 11 formed from the blank 10 thereby permits the consumer to grasp the edge of the retaining flap 15 adjacent an access slot 25 and lift the retaining flap away from the sleeve to tear the perforations in the top wall 30. The lifting motion separates a portion of the retaining flap 15 from the bottom wall 31 and provides access to the article 20 contained within the internal cavity 24. See FIGS. 4, 5, and 6.

As configured from the blank 10 of the present invention, the display window 16 is likewise positioned on the top wall such that the internal planar side 23 of the bottom wall 31 is viewable through the display window upon construction of the sleeve 11. Multiple display windows 16 thereby provide a view of at least two different positions on the internal planar side 23 of the bottom wall 31. Thus, two windows would provide a view of two separate articles.

Another aspect of the invention includes the use of the packaging blank 10 in conjunction with a method for packaging an article. This method is preferably accomplished at a packaging supplier's facility, thereby eliminating the requirement for a publisher to package the article 20 in a sleeve 11 and then bind the article-embedded sleeve in separate insertion steps. Stated differently, the publisher is not required to independently stock and track the primary article 20 and the sleeve.

In a preferred method, a flexible blank 10 is provided that includes a substantially rectangular top panel 13 and a substantially rectangular bottom panel 14 that are connected along a fold line. The blank 10 includes a retaining flap 15 formed by perforations in the top panel 13. It will be understood that the blank 10 may include a plurality of retaining flaps 15 that each include a window. In an alternative method, the blank provided may include a binding flap 21 attached to the top panel 13 opposite the bottom panel 14. Next, the article 20 to be packaged is placed on the internal planar side 23 of the flexible blank 10. It will be understood that the article 20 may be placed on the top panel 13 or bottom panel 14 in this first preferred method. In a preferred method, the article 20 is positioned and secured to the bottom panel 14 by means of a static charger. The static charger secures, for example, a CD to the bottom panel 14 at its original placement for approximately fifteen seconds or a time sufficient for folding the top panel 13 over the bottom panel 14 while the CD is temporarily secured to the panel. Alternatively, the article 20 may be secured to the blank 10 with adhesive.

The top panel 13 is then folded over the bottom panel 14 to form an internal cavity 24 in which the article 20 is positioned. Alternatively, the folding of the top panel 13 may likewise form a plurality of internal cavities when the blank 10 provided includes a plurality of retaining flaps 15 having a plurality of display windows 16. In a preferred method, the top panel 13 is folded to a position substantially adjacent to the bottom panel 14. Next, portions of the top panel 13 and bottom panel 14 are adhered to one another. It will be understood that the top and bottom panels 13, 14 may be adhered with a variety of adhesives to include glue (e.g., fugitive glue).

The step of positioning an article 20 may incorporate a conventional device that includes an arm having a suction means which retrieves an article 20 and then positions the same on a panel of the blank 10. For example, an item may be retrieved and then selectively placed on the blank 10 such that a bar code on an article 20 is viewable through the display window 16 upon construction of the container. Accordingly, a bar code scanner positioned along an automated production line may scan the bar code on the article, thereby expediting publication compliance (i.e., matching articles with their respective publications). In other words, the publisher can ensure that the appropriate article-embedded sleeve 11 is matched with the appropriate matter to be bound.

This placement method, commonly referred to as a "pick and place" action, eliminates many of the jamming problems associated with current insertion methods whereby articles are laterally inserted into a sleeve 11. The lateral insertion typically results in the edges of the CD catching the edges of the sleeve walls, thereby preventing proper insertion.

Upon folding the top panel 13, the article-embedded sleeve 11 is positioned in a standard feeder—as opposed to a specialty or modified feeder—common to conventional binding machinery along with the matter (e.g., magazine pages) to be bound. Next, the sleeve 11 and matter to be bound are simultaneously fed (i.e., stacked one atop the other) into the production line for binding. The sleeve 11 can be bound in the publication in several manners. First, the sleeve 11 can be adhered to the pages of the publication by adhesive in a "perfect bound" method. Alternatively, the sleeve 11 is capable of being bound with stitching. Advantageously, the sleeve 11 of the present invention is capable of being incorporated into conventional binding machinery without requiring publishers to retool or modify existing feeding mechanisms incorporated into the automated binding production line. In other words, the sleeve 11 can be readily fed into existing binding machinery along with pages to be bound without using a specialty feeder required when binding prior art sleeves.

As known to those skilled in the art, the sleeve 11 may be bound in a publication such that the top wall 30 or the bottom wall 31 is initially presented to the reader. Accordingly, it will be understood that the binding flap 21 may be presented before the top wall 30 or bottom wall 31, depending upon the orientation of the sleeve 11 during the binding process.

Accordingly, the present method whereby an article 20 is positioned on the blank 10, and the sleeve 11 is subsequently formed around the article, promotes substantially higher assembly speeds and lower waste than existing methods, whereby the sleeve 11 is formed and then the article 20 is inserted into the finished sleeve. Stated differently, the present method positions an article 20 during the formation of the sleeve 11, as opposed to inserting the article 20 after construction of the sleeve 11 (e.g., lateral insertion of CD into sleeve with the assistance of a directed air stream). Thus, the finished sleeve 11 includes an article 20 and is ready for incorporation into conventional binding machinery. Moreover, the present method is capable of incorporating a wide variety of substantially flat or near planar articles into the present sleeve 11. For example, cosmetics samplers, consumable goods (e.g., instant coffee), small toys, and the like may be packaged in accordance with the present invention. In addition, multiple products can be placed in the same sleeve 11.

In the drawings and specification, there have been disclosed typical embodiments on the invention and, although specific terms have been employed, they have been used in a generic and descriptive sense only and not for purposes of limitation, the scope of the invention being set forth in the following claims.

That which is claimed is:

1. A method of packaging articles, said method comprising:
   providing a flexible blank having an internal planar side and an external planar side, the flexible blank having a substantially rectangular top panel comprising a display window and perforated retaining flap corresponding to the display window, and a substantially rectangular bottom panel connected to the top panel along a fold line;
   positioning and securing, with adhesive, an article to be packaged onto the internal planar side of the flexible blank;
   folding the top panel over the bottom panel, thereby forming a sleeve having an internal cavity in which the article is positioned; and
   binding the sleeve in a publication.

2. A packaging method according to claim 1, wherein the step of folding the top panel comprises:
   folding the top panel to a position substantially parallel to the bottom panel; and
   adhering portions of the top and bottom panels together.

3. A packaging method according to claim 2, wherein the step of folding the top panel further comprises folding the top panel over the bottom panel such that at least one article is viewable through the display window formed in the top panel.

4. A packaging method according to claim 1, wherein the step of binding a sleeve comprises:
   positioning the sleeve in a binding production line;
   advancing the sleeve into the production line such that the sleeve is adjacent matter to be bound; and
   binding the sleeve into a publication.

5. A packaging method according to claim 4, wherein the step of binding a sleeve further comprises adhering the sleeve to the matter to be bound such that the sleeve is secured to the bound matter.

6. A packaging method according to claim 4, wherein the blank provided includes a binding flap connected to the top panel, opposite the bottom panel; and the step of binding further comprises stitching the binding flap such that the sleeve is secured to the bound matter.

7. A method of packaging articles, said method comprising:

providing a flexible blank having an internal planar side and an external planar side, the flexible blank having a substantially rectangular top panel comprising a display window and perforated retaining flap corresponding to the display window, a substantially rectangular bottom panel connected to the top panel along a fold line, and a binding flap connected to the top panel, opposite the bottom panel;

positioning an article to be packaged o n the internal planar side of the flexible blank;

folding the top panel over the bottom panel, thereby forming a sleeve having an internal cavity in which the article is positioned;

positioning the sleeve in a binding product ion line;

advancing the sleeve into the product ion line such that the sleeve is adjacent matter to be bound; and binding the sleeve by stitching the binding flap to secure the sleeve to the bound matter.

8. A packaging method according to claim 7, wherein the step of positioning the article to be packaged further comprises securing, with a static charge the article to the internal planar side of the flexible blank.

9. A packaging method according to claim 7, where in the step of positioning the article to be packaged further comprises securing, with adhesive, the article to the internal planar side of the flexible blank.

10. A packaging method according to claim 7, wherein the step of folding the top panel comprises:

folding the top panel to a position substantially parallel to the bottom panel; and adhering portions of the top and bottom panels together.

11. A packaging method according to claim 10, wherein the step of folding the top panel further comprises folding the top panel over the bottom panel such that at least one article is viewable through the display window formed in the top panel.

* * * * *

UNITED STATES PATENT AND TRADEMARK OFFICE
CERTIFICATE OF CORRECTION

PATENT NO.    : 6,446,417 B1
DATED         : September 10, 2002
INVENTOR(S)   : Lux, Jr. et al.

It is certified that error appears in the above-identified patent and that said Letters Patent is hereby corrected as shown below:

Column 11,
Line 21, the word "o n" should be corrected to read -- on --, eliminating the space between the letters.

Column 12,
Line 1, the words "product ion" should be corrected to read "production" eliminating the space between the words, thereby making it into one word.
Line 2, the words "product ion" should be corrected to read "production" eliminating the space between the words, thereby making it into one word.

Signed and Sealed this

Thirty-first Day of December, 2002

JAMES E. ROGAN
*Director of the United States Patent and Trademark Office*